United States Patent
Bucknell

(10) Patent No.: US 8,628,025 B2
(45) Date of Patent: Jan. 14, 2014

(54) VEHICLE WASTE HEAT RECOVERY SYSTEM AND METHOD OF OPERATION

(75) Inventor: John R. Bucknell, Royal Oak, MI (US)

(73) Assignee: GM Global Technology Operations LLC, Detroit, MI (US)

(*) Notice: Subject to any disclaimer, the term of this patent is extended or adjusted under 35 U.S.C. 154(b) by 981 days.

(21) Appl. No.: 12/720,193

(22) Filed: Mar. 9, 2010

(65) Prior Publication Data
US 2011/0220729 A1  Sep. 15, 2011

(51) Int. Cl.
*B60H 1/04* (2006.01)

(52) U.S. Cl.
USPC .......... 237/12.3 R; 237/28; 237/5; 237/12.1; 237/12.3 B; 237/12.4; 903/902; 60/597; 60/616; 60/618; 123/41.21; 180/65.31

(58) Field of Classification Search
USPC .......... 237/12.3 R, 28, 5, 12.1, 12.3 B, 12.4; 60/618, 597, 616; 123/41.21; 180/65.31
See application file for complete search history.

(56) References Cited

U.S. PATENT DOCUMENTS

| 4,342,200 | A | * | 8/1982 | Lowi, Jr. ......................... 62/191 |
| 6,725,662 | B2 | | 4/2004 | Baba et al. |
| 6,732,525 | B2 | | 5/2004 | Endoh et al. |
| 6,739,389 | B2 | | 5/2004 | Nakagawa et al. |
| 6,761,030 | B2 | | 7/2004 | Niikura et al. |
| 6,823,668 | B2 | | 11/2004 | Endoh et al. |
| 6,834,503 | B2 | | 12/2004 | Freymann |
| 6,907,734 | B2 | | 6/2005 | Shinohara et al. |
| 6,910,333 | B2 | | 6/2005 | Minemi et al. |
| 6,948,319 | B2 | | 9/2005 | Hayakawa et al. |
| 6,990,805 | B2 | | 1/2006 | Ohta et al. |
| 7,056,251 | B2 | * | 6/2006 | Ibaraki .............................. 475/5 |
| 7,069,884 | B2 | | 7/2006 | Baba et al. |
| 7,181,912 | B2 | | 2/2007 | Mori |
| 7,281,380 | B2 | | 10/2007 | Shinohara et al. |

(Continued)

FOREIGN PATENT DOCUMENTS

| EP | 1935683 A1 | 6/2008 |
| JP | 60080922 A | 5/1985 |
| JP | 2003262127 A * | 9/2003 |
| WO | 2008031939 A2 | 3/2008 |

OTHER PUBLICATIONS

Lodwig, Erwin, 'Performance of a 35 HP Organic Rankine Cycle Exhaust Powered System', SAE Paper 700160, 1970, 34 pgs.

(Continued)

*Primary Examiner* — Kang Hu
*Assistant Examiner* — Nathaniel Herzfeld
(74) *Attorney, Agent, or Firm* — Harness, Dickey & Pierce, P.L.C.

(57) ABSTRACT

A vehicle waste heat recovery system may include a first pump, an internal combustion engine, a waste heat recovery device and a condenser. The first pump may be in fluid communication with a fluid. The internal combustion engine may be operable to power rotation of a drive axle of a vehicle and may define an engine coolant passage having an inlet in fluid communication with an outlet of the first pump. The waste heat recovery device may have an inlet in fluid communication with an outlet of the engine coolant passage. The condenser may have an inlet in fluid communication with an outlet of the waste heat recovery device and an outlet in fluid communication with an inlet of the first pump.

8 Claims, 9 Drawing Sheets

(56) References Cited

U.S. PATENT DOCUMENTS

| | | | |
|---|---|---|---|
| 2001/0040061 A1* | 11/2001 | Matuda et al. | 180/68.2 |
| 2002/0104697 A1* | 8/2002 | Hatanaka | 180/65.4 |
| 2003/0115877 A1 | 6/2003 | Bara et al. | |
| 2006/0266072 A1* | 11/2006 | Takeuchi et al. | 62/500 |
| 2007/0245737 A1* | 10/2007 | Inaba et al. | 60/670 |
| 2010/0083919 A1* | 4/2010 | Bucknell | 123/41.21 |
| 2012/0198875 A1* | 8/2012 | Tate et al. | 62/222 |

OTHER PUBLICATIONS

Hoagland, L.C., Demler, R.L., et al, 'Design Features and Initial Performance Data of an Automotive Steam Engine—Part 1 Overall Powerplant Description and Performance', SAE Paper 740295, 1974, 18 pgs.
Syniuta, W.D. and Palmer, R.M., Design Features and Initial Performance Data of an Automotive Steam Engine—Part 2 Reciprocating Steam Expander—Design Features and Performance, SAE Paper 740296, 1974, 20 pgs.
Jakuba, S. and McGeehan, J. 'Component Development of Automotive Reciprocating Steam Expanders', SAE Paper 750068, 1974, 16 pgs.
Patel, P. and Doyle, E., 'Compounding the Truck Diesel Engine with an Organic Rankine Cycle System', SAE Paper 760343, 1976, 16 pgs.
Leising, C.J., Purohit, G.P., et al., 'Waste Heat Recovery in Truck Engines', SAE Paper 780686, 1978, 12 pgs.
Doyle, E., DiNanno, L., et al., 'Installation of a Diesel-Organic Rankine Compound Engine in a Class 8 Truck for a Single-Vehicle Test', SAE Paper 790646, 1979, 16 pgs.
Chen, S. K. and Lin, R., 'A Review of Engine Advanced Cycle and Rankine Bottoming Cycle and Their Loss Evaluations', SAE Paper 830124, 1983, 35 pgs.
Heron, T.A.E. and Bullock, K.J., 'Design Concepts of a New Generation Reciprocating Steam Engine', SAE Paper 850032, 1985, 16 pgs.
Fort, E.F., Blumberg, P.M., et al., 'Evaluation of Positive Displacement Supercharging and Waste Heat Recovery for an LHR Diesel', SAE Paper 870026, 1987, 12 pgs.

Hay, E. and Hay, N. 'Thermal Energy Retrieval System for Road Vehicles', SAE Paper C496/055/95, 1995, pp. 637-641.
Atan, R., 'Heat Recovery Equipment (Generator) in an Automobile for an Absorption Air-Conditioning System', SAE Paper 980062, 1998, 15 pgs.
Buschmann, G., Haas, T., et al., 'IAV's Steam Engine A Unique Approach to Fulfill Emission Levels from SULEV to ZEV', SAE Paper 2001-01-0366, 2001, 11 pgs.
Diehl, P., Haubner, F., et al., 'Exhaust Heat Recovery System for Modern Cars', SAE Paper 2001-01-1020, 2001, 13 pgs.
Crane, D., Jackson, G., et al., 'Towards Optimization of Automotive Waste Heat Recovery Using Thermoelectrics', SAE Paper 2001-01-1021, 2001, 13 pgs.
Lambert, C., 'Solving the Filtration Challenges for Diesel Fuel', SAE Paper 2004-01-1451, 2004, 15 pgs.
Stobart, R. and Weerasinghe, R., 'Heat Recovery and Bottoming Cycles for SI and CI Engines—A Perspective', SAE Paper 2006-01-0662, 2006, 11 pgs.
Teng, Ho, Regner, G., et al., 'Achieving High Engine Efficiency for Heavy-Duty Diesel Engines by Waste Heat Recovery Using Supercritical Organic-Fluid Rankine Cycle', SAE Paper 2006-01-3522, 2006, 13 pgs.
Endo, T., Kawajiri, S., et al., 'Study on Maximizing Exergy in Automotive Engines', SAE Paper 2007-01-0257, 2007, 12 pgs.
Teng, Ho, Regner, G., et al., 'Waste Heat Recovery of Heavy-Duty Diesel Engines by Organic Rankine Cycle Part I Hybrid Energy System of Diesel and Rankine Engines', SAE Paper 2007-01-0537, 2007, 13 pgs.
Teng, Ho, Regner, G., et al., 'Waste Heat Recovery of Heavy-Duty Diesel Engines by Organic Rankine Cycle Part II Working Fluids for WHR-ORC', SAE Paper 2007-01-0543, 2007, 12 pgs.
LaGrandeur, J., Crane, D. and Eder, A., 'Vehicle Fuel Economy Improvement through Thermoelectric Waste Heat Recovery', 2007, 7 pgs.
BMW Press Release, Turbosteamer, Dec. 7, 2005, 4 pgs.
Goswami, D. Yogi et al., "Analysis of a New Thermodynamic Cycle for Combined Power and Cooling Using Low and Mid Temperature Solar Collectors", Journal of Solar Energy Engineering, vol. 121, May 1999, pp. 91-97.

* cited by examiner

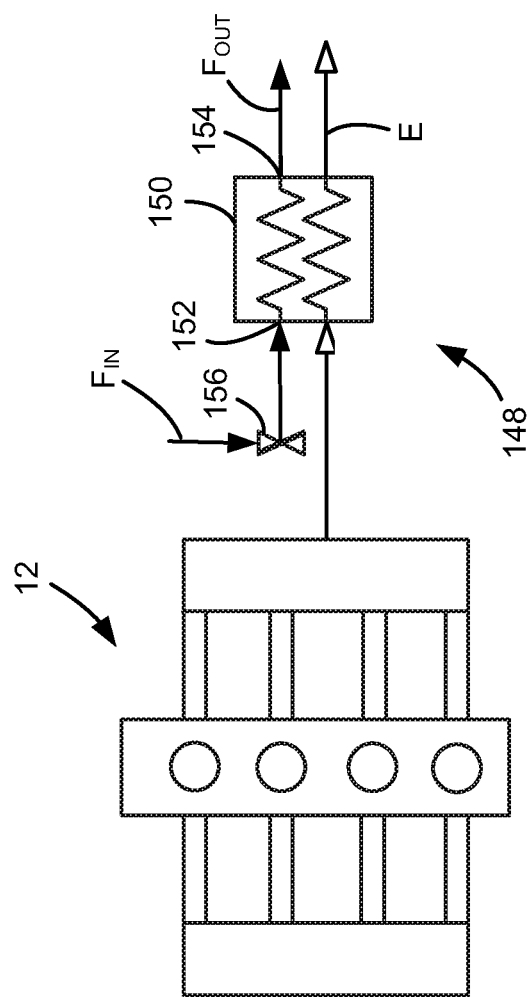

VEHICLE WASTE HEAT RECOVERY SYSTEM AND METHOD OF OPERATION

FIELD

The present disclosure relates to vehicle waste heat recovery systems.

BACKGROUND

This section provides background information related to the present disclosure which is not necessarily prior art.

Waste heat recovery systems provide for utilization of energy from heat generating components. A variety of systems may convert waste heat into usable energy. However, implementation of waste heat recovery systems into vehicle applications may include significant increases in vehicle mass and/or cost relative to fuel economy benefits provided by the system.

SUMMARY

A vehicle waste heat recovery system may include a first pump, an internal combustion engine, a waste heat recovery device and a condenser. The first pump may be in fluid communication with a fluid. The internal combustion engine may be operable to power rotation of a drive axle of a vehicle and may define an engine coolant passage having an inlet in fluid communication with an outlet of the first pump. The waste heat recovery device may have an inlet in fluid communication with an outlet of the engine coolant passage. The condenser may have an inlet in fluid communication with an outlet of the waste heat recovery device and an outlet in fluid communication with an inlet of the first pump.

In another arrangement, a waste heat recovery system may include a hybrid powertrain, a transmission heat exchanger, a first pump and a waste heat recovery device. The hybrid powertrain may include an internal combustion engine and a hybrid power assembly. The internal combustion engine may be operable to power rotation of a drive axle of a vehicle and may define an engine coolant passage. The hybrid power assembly may include an electric motor operably engaged with the drive axle to propel the vehicle and a hybrid electronics heat exchanger. The first pump may be in fluid communication with a fluid and may have an outlet in fluid communication with an inlet of the engine coolant passage, an inlet of the hybrid electronics heat exchanger, and an inlet of the transmission heat exchanger. The waste heat recovery device may include an inlet in fluid communication with an outlet of the engine coolant passage, an outlet of the hybrid electronics heat exchanger, and an outlet of the transmission heat exchanger. An outlet of the waste heat recovery device may be in fluid communication with an inlet of the first pump.

A waste heat recovery method for a vehicle may include operating a vehicle waste heat recovery system in a waste heat recovery mode including pumping a fluid through a cooling system of an internal combustion engine and transferring heat from the engine to the fluid. The method may further include providing the fluid exiting the engine cooling system to a waste heat recovery device and recovering energy from the transferred heat. The fluid exiting the waste heat recovery device may be provided to a condenser and then returned to the engine cooling system.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only and are not intended to limit the scope of the present disclosure in any way.

FIG. 9 is a schematic illustration of additional components of the waste heat recovery system according to the present disclosure.

Corresponding reference numerals indicate corresponding parts throughout the several views of the drawings.

DETAILED DESCRIPTION

Examples of the present disclosure will now be described more fully with reference to the accompanying drawings. The following description is merely exemplary in nature and is not intended to limit the present disclosure, application, or uses.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

When an element or layer is referred to as being "on," "engaged to," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Figure 1:
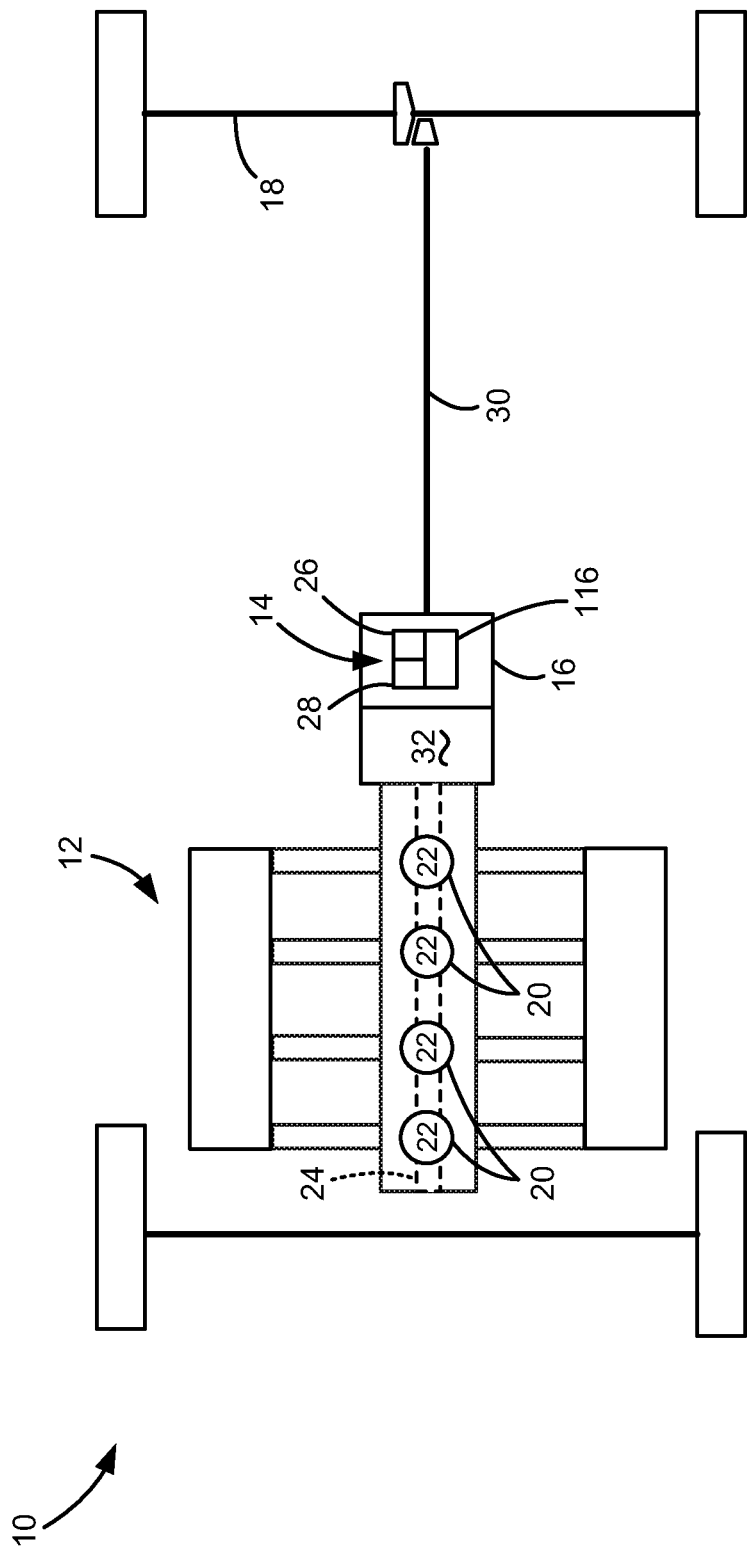
FIG. 1 is a schematic illustration of a vehicle assembly according to the present disclosure.

With reference to FIG. 1, a vehicle assembly 10 is schematically illustrated. The vehicle assembly 10 may form a hybrid vehicle assembly including an engine 12, a hybrid power assembly 14, a transmission 16 and a drive axle 18. The engine 12 may form an internal combustion engine defining cylinders 20 having pistons 22 disposed therein and driving rotation of a crankshaft 24 via in-cylinder combustion.

The hybrid power assembly 14 may include an electric motor 26 and a rechargeable battery 28. The electric motor 26 and rechargeable battery 28 may form a drive mechanism for the hybrid power assembly 14. The motor 26 may be in electrical communication with the battery 28 to convert power from the battery 28 to mechanical power. The motor 26 may additionally be powered by the engine 12 and operated as a generator to provide power to charge the battery 28. The hybrid power assembly 14 may be incorporated into and engaged with the transmission 16. The motor 26 may be coupled to an output shaft 30 to power rotation of the drive axle 18 via the transmission 16.

The engine 12 may be coupled to the transmission 16 via a coupling device 32 and may drive the transmission 16. By way of non-limiting example, the coupling device 32 may include a friction clutch or a torque converter. The transmission 16 may use the power provided from the engine 12 and/or the motor 26 to drive the output shaft 30 and power rotation of the drive axle 18.

Figure 2:
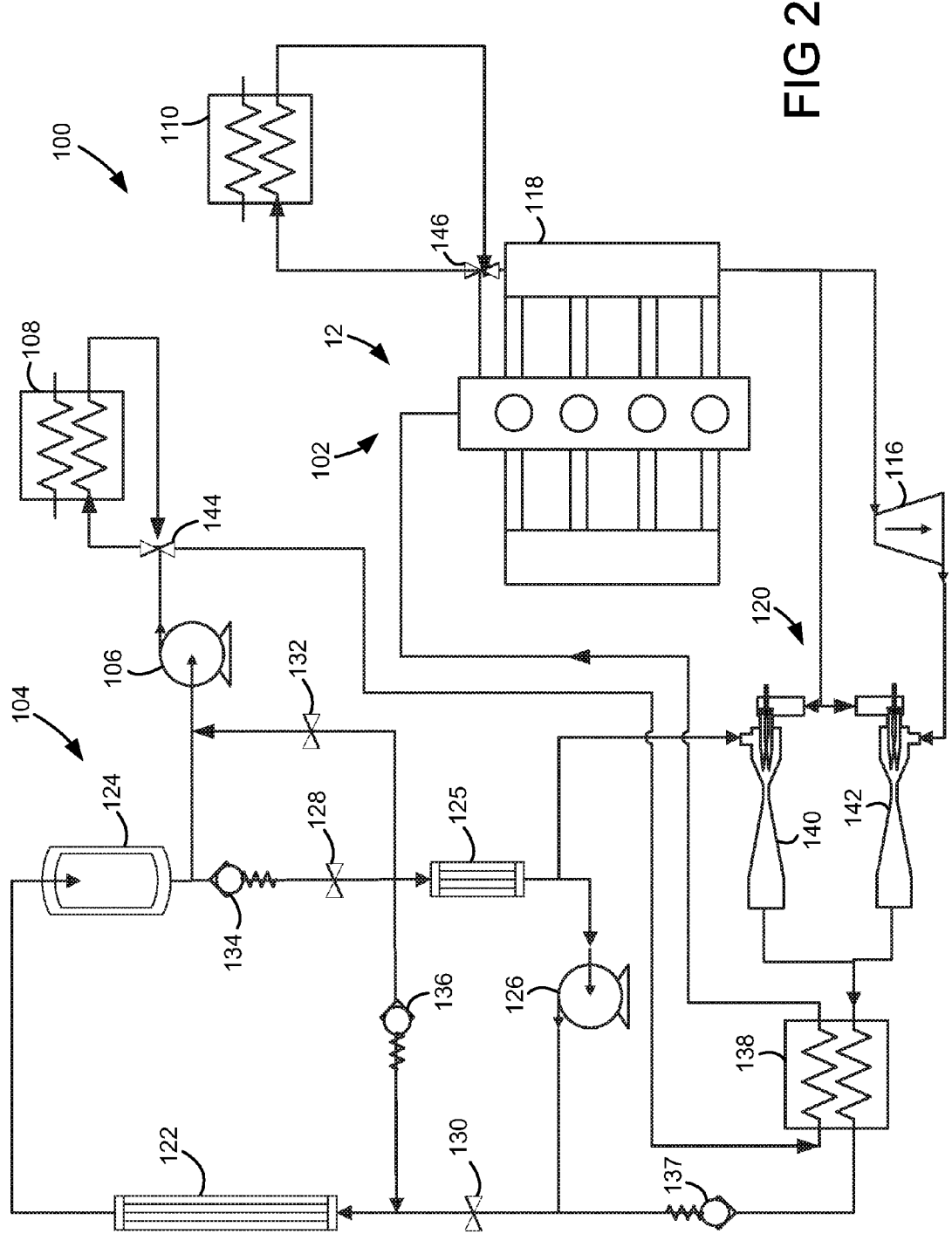
FIG. 2 is a schematic illustration of a waste heat recovery system of the vehicle of FIG. 1.

With reference to FIG. 2, the vehicle assembly 10 may additionally include a waste heat recovery system 100. The waste heat recovery system 100 may include an engine cooling system 102, a vehicle temperature control system 104, a first pump 106, an electronics heat exchanger 108, a transmission heat exchanger 110, and an energy recovery device (expander) 116. A common working fluid may be used for the components of the waste heat recovery system 100. By way of non-limiting example, the fluid may have an evaporation temperature of between one and two hundred degrees Celsius, including but not limited to refrigerants R717, R134a, R1234yf, R718, R1150.

In the present non-limiting example, the engine cooling system 102 may include coolant passages in the engine block and/or cylinder head and may additionally include passages in a liquid-jacketed exhaust manifold 118. The engine cooling system 102 may form an evaporator for the system. The engine 12 may be cooled by the working fluid as it passes through the engine cooling system 102. The waste heat recovery system 100 may be operable in a variety of modes to provide energy recovery as well as cabin heating and cooling during various vehicle operating conditions, discussed below.

The temperature control system 104 may include a second pump 120, a condenser 122, a drier bottle (liquid/gas separator) 124, a cabin heat exchanger 125, an electric air conditioner compressor 126, first, second and third control valves 128, 130, 132, first, second and third check valves 134, 136, 137, and an additional heat exchanger (economizer) 138. The condenser 122 may be located between an inlet of the first pump 106 and an outlet of the second pump 120. The second pump 120 may be located between the waste heat recovery device 116 and the condenser 122 and may include first and second ejector pumps 140, 142.

During waste heat recovery operation, the first pump 106 may pressurize liquid fluid from the condenser 122 to a supercritical or higher working pressure and pump the fluid through the engine cooling system 102, heating the working fluid to a supercritical temperature. The working fluid may be in the form of a superheated vapor when it exits the engine cooling system 102. The superheated vapor is expanded in the waste heat recovery device 116, providing recovered energy, and then returned to the condenser 122 by the second pump 120 where the vapor is returned to a liquid state and again provided to the first pump 106.

The electronics heat exchanger 108, the transmission heat exchanger 110 and the economizer 138 may additionally be in communication with and located between the first pump 106 and the waste heat recovery device 116. The first pump 106 may force the fluid through electronics heat exchanger 108, the transmission heat exchanger 110 and the economizer 138 before providing the fluid to the waste heat recovery device.

In the present non-limiting example, electronics heat exchanger 108, the transmission heat exchanger 110 and the economizer 138 are located between the first pump 106 and the engine cooling system 102. A fourth control valve 144 may be located between the first pump 106 and the electronics heat exchanger 108 to control fluid flow to the electronics heat exchanger 108 and a fifth control valve 146 may be located between the first pump 106 and the transmission heat exchanger 110 to control fluid flow to the transmission heat exchanger 110.

Figure 3:
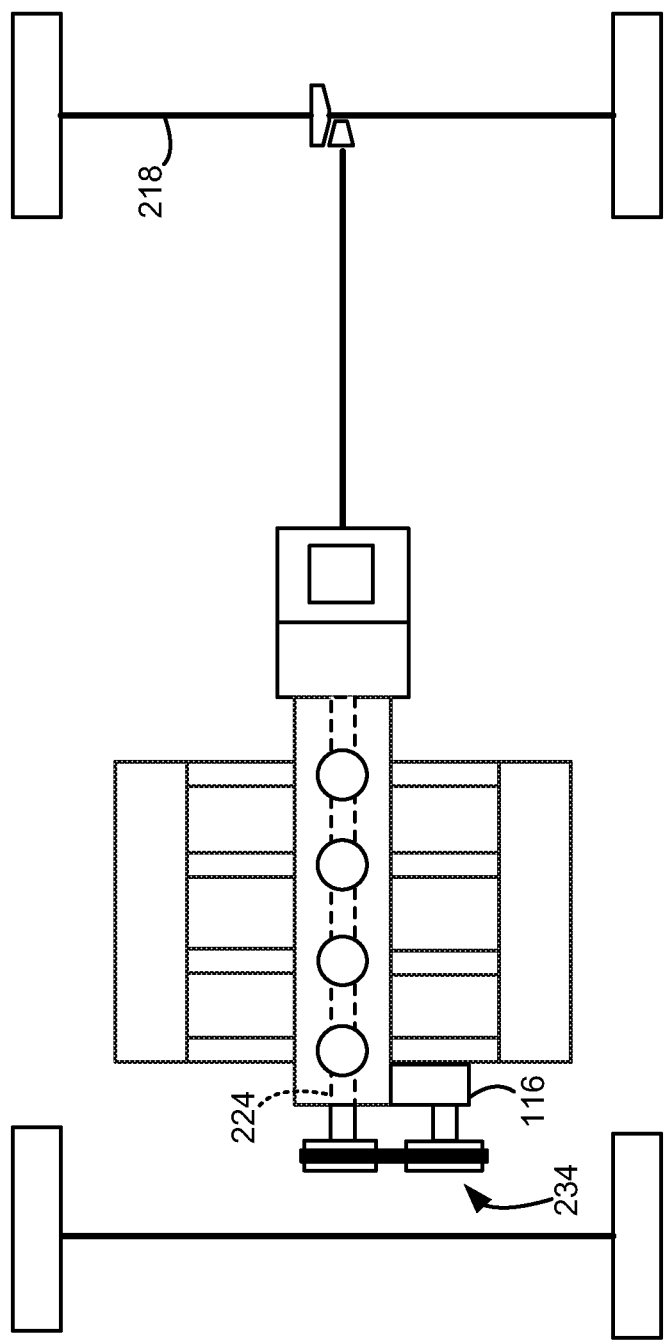
FIG. 3 is a schematic illustration of an alternate vehicle assembly including the waste heat recovery system of FIG. 2.

The recovered energy may be used to power rotation of the drive axle 18. In a first arrangement (FIG. 1), the waste heat recovery device 116 may be incorporated into the transmission 16 and may power rotation of the drive axle 18 during a portion of vehicle operation. In another arrangement, seen in FIG. 3, the waste heat recovery device 116 may be coupled to the crankshaft 224 via a pulley system 234 to drive rotation of the crankshaft 224 and thereby power rotation of the drive axle 218 during a portion of vehicle operation. The waste heat recovery device 116 may take on a variety of forms, including but not limited to linear piston expanders, turbomachines, screw expanders, etc. The waste heat recovery system 100 provides for various vehicle operating modes both with and without operation of the engine 12.

Figure 4:
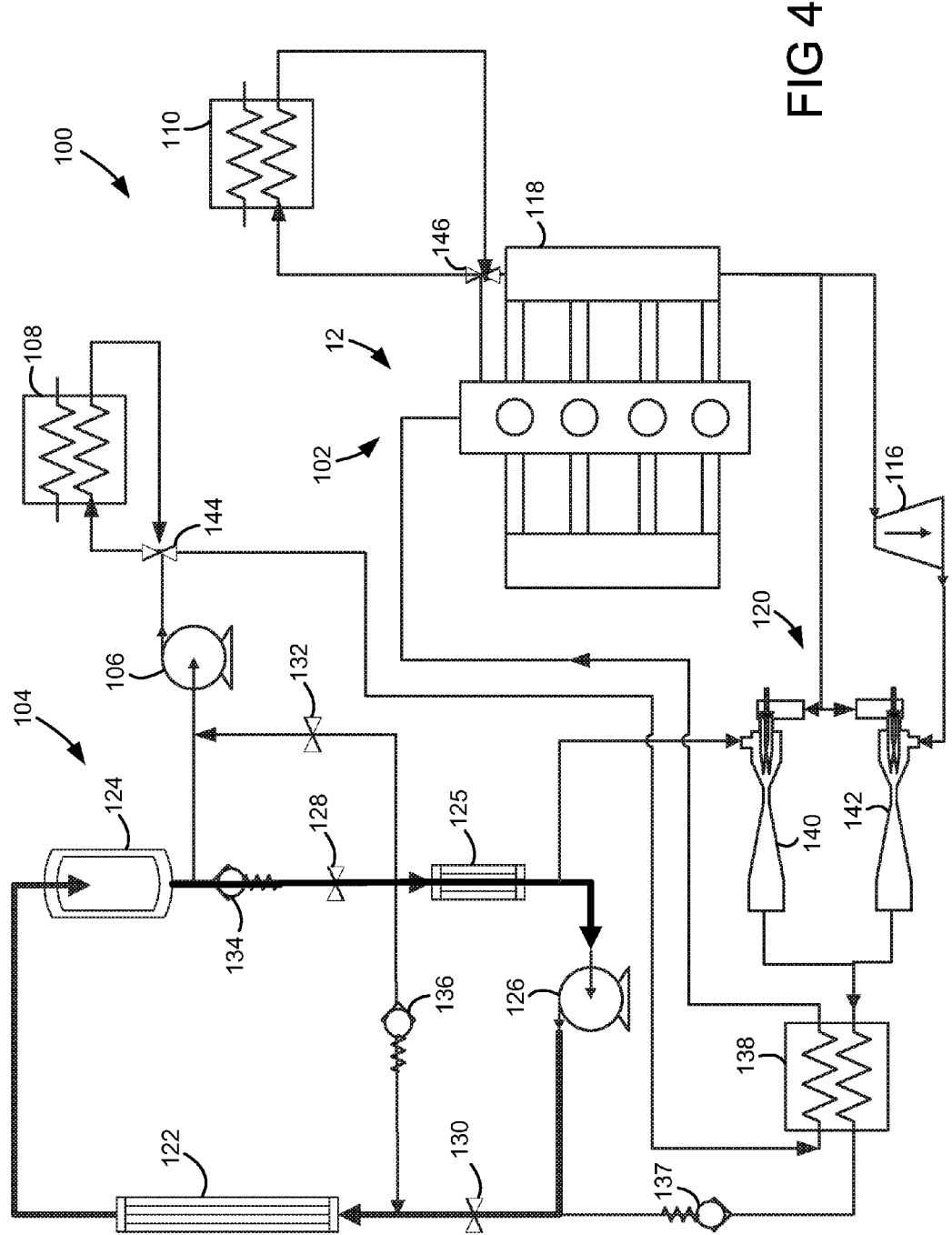
FIG. 4 is a schematic illustration of the waste heat recovery system of FIG. 2 in a first operating mode.

A first operating mode (engine-off cabin cooling) is illustrated in FIG. 4. The engine 12 and the first and second pumps 106, 120 are off during the first mode. This arrangement isolates the temperature control system 104 from the rest of the waste heat recovery system 100, and more specifically from the engine 12. In the present non-limiting example, the compressor 126 is decoupled from the engine 12 and operates to force the fluid through a cooling loop. The compressor 126 raises the pressure of the fluid across the condenser 122 and provides suction to the first control (expansion) valve 128. The compressor 126 may be electrically powered for operation during engine-off conditions. The fluid that is compressed by the compressor 126 flows across the condenser to subcool the refrigerant below its saturated liquid temperature. The drier bottle 124 is located downstream of the condenser 122. Liquid refrigerant is drawn from the drier bottle 124 through the expansion valve 128 and then the cabin heat exchanger 125 by the suction generated from the compressor 126 to cool the vehicle cabin.

The first check valve 134 may be located between the expansion valve 128 and the drier bottle 124 to prevent back flow from the cabin heat exchanger 125 during operation in a cabin heating mode (discussed below). The second control (regulating) valve 130 may be located between the compressor 126 and condenser 122 for the cabin heating mode. The regulating valve 130 may be open during the cooling mode to provide communication between the compressor 126 and the condenser 122. The temperature control system 104 may include an additional drier bottle (not shown) between the cabin heat exchanger 125 and the compressor 126 in applications where the compressor 126 cannot tolerate liquid refrigerant. The third check valve 137 may be located between the economizer 138 and the condenser 122 to prevent backflow from the condenser 122 through the economizer 138 during the first operating mode.

Figure 5:
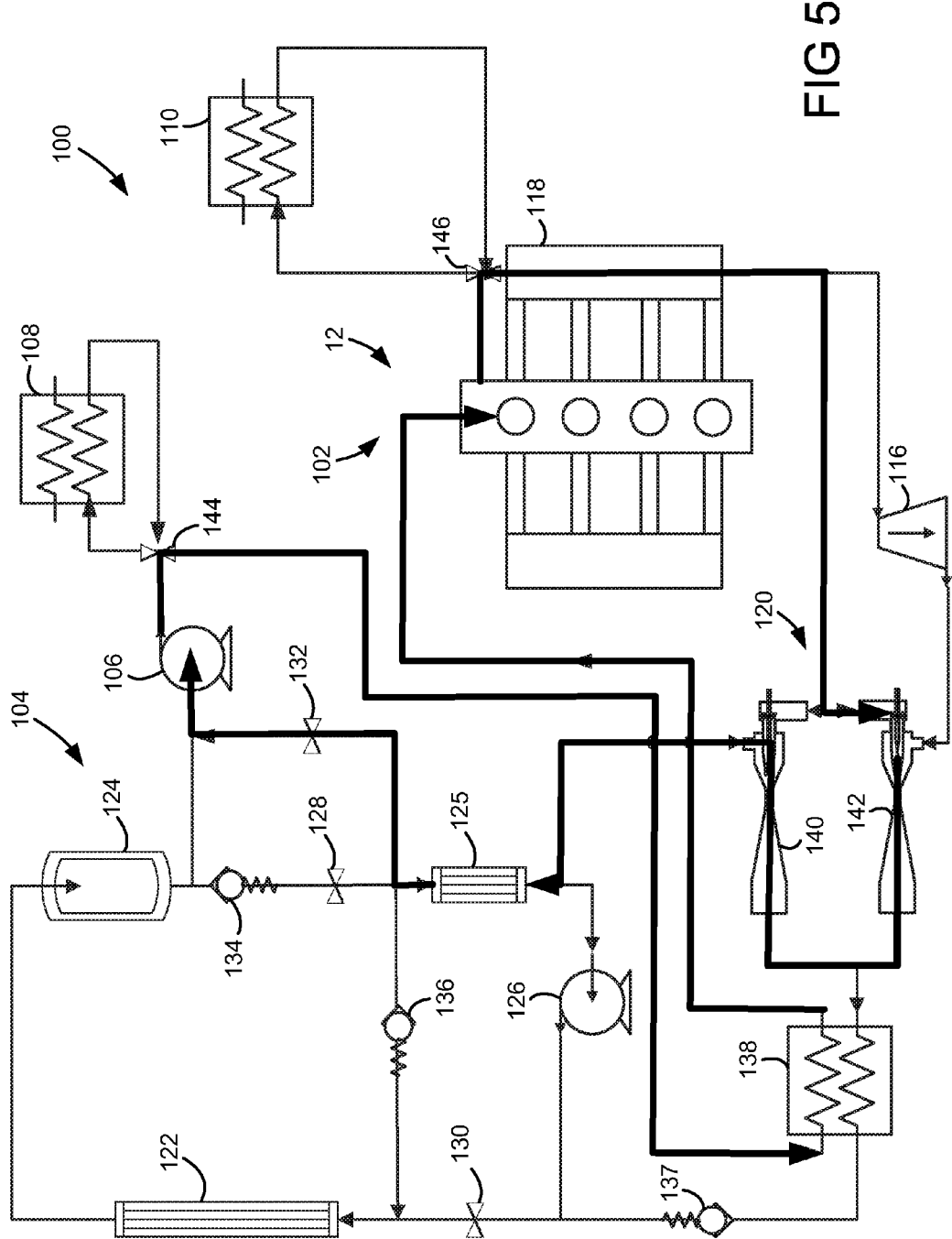
FIG. 5 is a schematic illustration of the waste heat recovery system of FIG. 2 in a second operating mode.

A second operating mode (engine and cabin warm-up) is illustrated in FIG. 5. During operation of the engine 12 at a temperature below a desired operating temperature (i.e., cold start), the regulating valve 130 may be closed and the third control (recirculation) valve 132 may be open. The ejector pump motive fluid solenoid (motive fluid inlet) for the first ejector pump 140 may be closed and the waste heat recovery device 116 may be off during the second operating mode. Additionally, the fourth and fifth control (three-way regulating) valves 144, 146 may be in a bypass position, preventing fluid flow from the first pump 106 through the electronics heat exchanger 108 and the transmission heat exchanger 110.

The first pump 106 may force the fluid at a moderate pressure through the heat exchanger (economizer) 138 and to the engine cooling system 102 where the fluid acquires heat energy. The fluid may acquire additional heat energy at the exhaust manifold 118. The ejector pump motive fluid solenoid (motive fluid inlet) for the second ejector pump 142 may be open and in communication with the fluid exiting the engine cooling system 102. The warm fluid exiting the engine cooling system 102 backflows through the first ejector pump 140 due to the pumping effect of the second ejector pump 142 and the closure of the regulating valve 130 and proceeds to the cabin heat exchanger 125 to heat the vehicle cabin. The fluid then continues through the recirculation valve 132 and back to the first pump 106.

Figure 6:
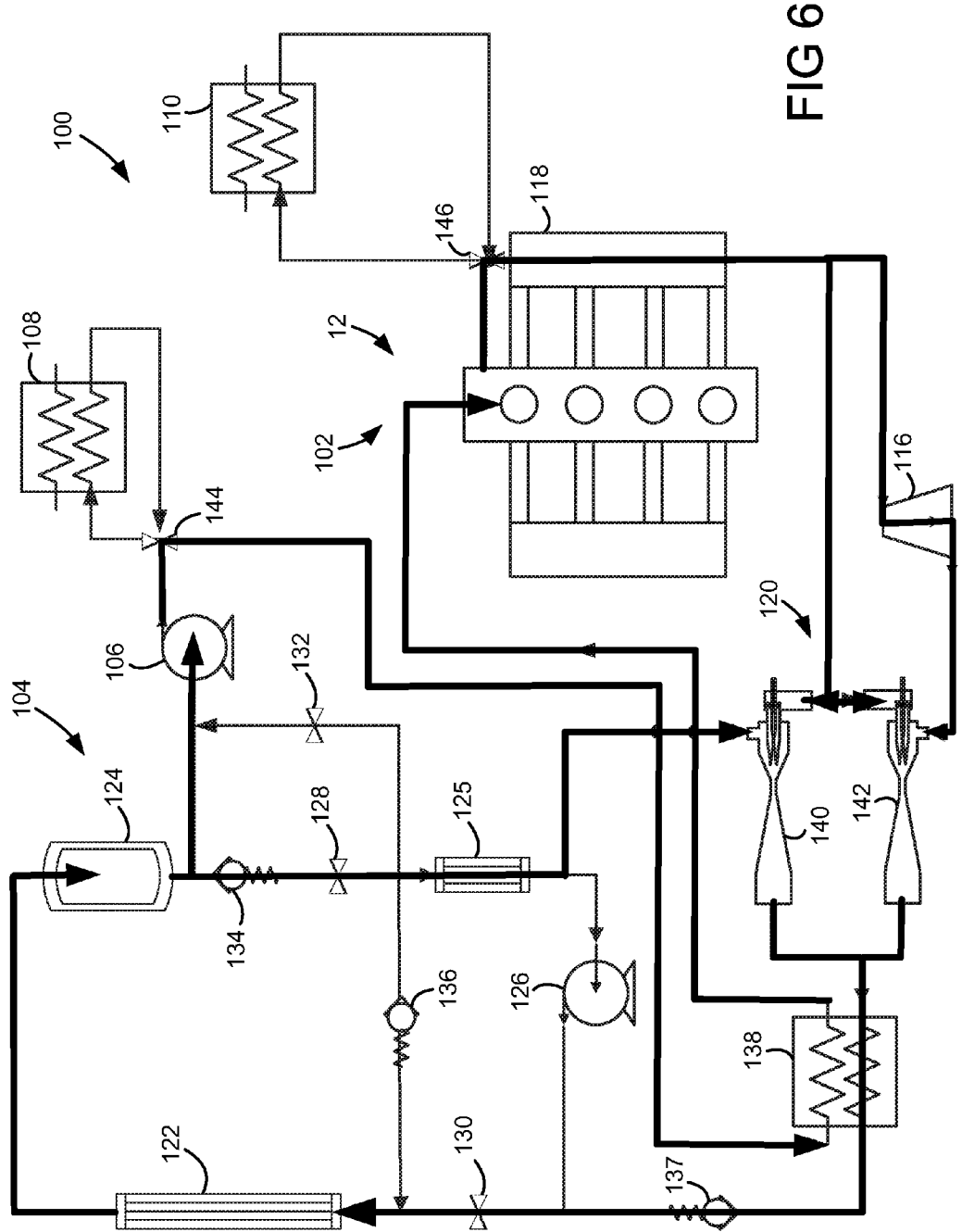
FIG. 6 is a schematic illustration of the waste heat recovery system of FIG. 2 in a third operating mode.

A third operating mode (engine fully warmed-up with cabin cooling) is illustrated in FIG. 6. During the third operating mode, the waste heat recovery device 116 may be operated and the temperature control system 104 may be operated in a refrigeration cycle. In the third operating mode, the recirculation valve 132 is closed, the compressor 126 is off, and the ejector pump motive fluid solenoids for both the first and second ejector pumps 140, 140 are both on and modulating fluid flow to the condenser 122. The three-way regulating valves 144, 146 for the electronics and transmission heat exchangers 108, 110 may be modulated to control fluid flow to manage and recover heat in those components.

The first pump 106 draws liquid fluid from the drier bottle 124 and raises the fluid pressure to operating pressure. The fluid may then exchange heat with moderate temperature components including, but not limited to, electronics via the electronics heat exchanger 108 before flowing through the economizer 138 wherein additional heat energy is acquired. A bypassing valve (not shown) may additionally be included to bypass the economizer 138. The fluid may flow from the economizer 138 the engine cooling system 102 where additional heat energy is acquired by the fluid. The fluid may then flow through the jacketed exhaust manifold 118 where additional heat energy is acquired.

The three-way regulating valve 146 may be located between the engine cooling system 102 and the exhaust manifold 118 to manage fluid flow to the transmission heat exchanger 110 and control the temperature of the transmission components. The majority of the fluid flow exiting the engine cooling system 102 may then flow to the waste heat recovery device 116 where the high pressure and high energy fluid is expanded and converted to mechanical work. A portion of the fluid exiting the engine cooling system 102 flows to the ejector pump motive fluid solenoids of the first and second ejector pumps 140, 142 to pump the fluid to the condenser 122.

The first ejector pump 140 may create a vacuum and draw the fluid (in a liquid state) from the drier bottle 124 through the first check valve 134 and through the expansion valve 128 to the cabin heat exchanger 125 to cool the vehicle cabin. The fluid drawn through the first ejector pump 140 from the cabin heat exchanger 125 may be combined with the fluid flow through the second ejector pump 142 and provided to the condenser 122. As the fluid is drawn through the expansion valve 128 the fluid cools, thereby cooling the cabin as the fluid then passes through the cabin heat exchanger 125. The fluid is heated by the cabin heat as it passes through the cabin heat exchanger 125. The heat acquired from the cabin may be recovered by the economizer 138 and fed back into the waste heat recovery device 116.

The second ejector pump 142 may use a portion of the fluid exiting the engine cooling system 102 to act as a heat pump to modulate the pressure at the condenser 122 to ensure condensation in varying ambient temperatures. The fluid flows from the outlet of the condenser 122 to the drier bottle 124 and then to the first pump 106 and the cabin heat exchanger 125 as discussed above.

Figure 7:
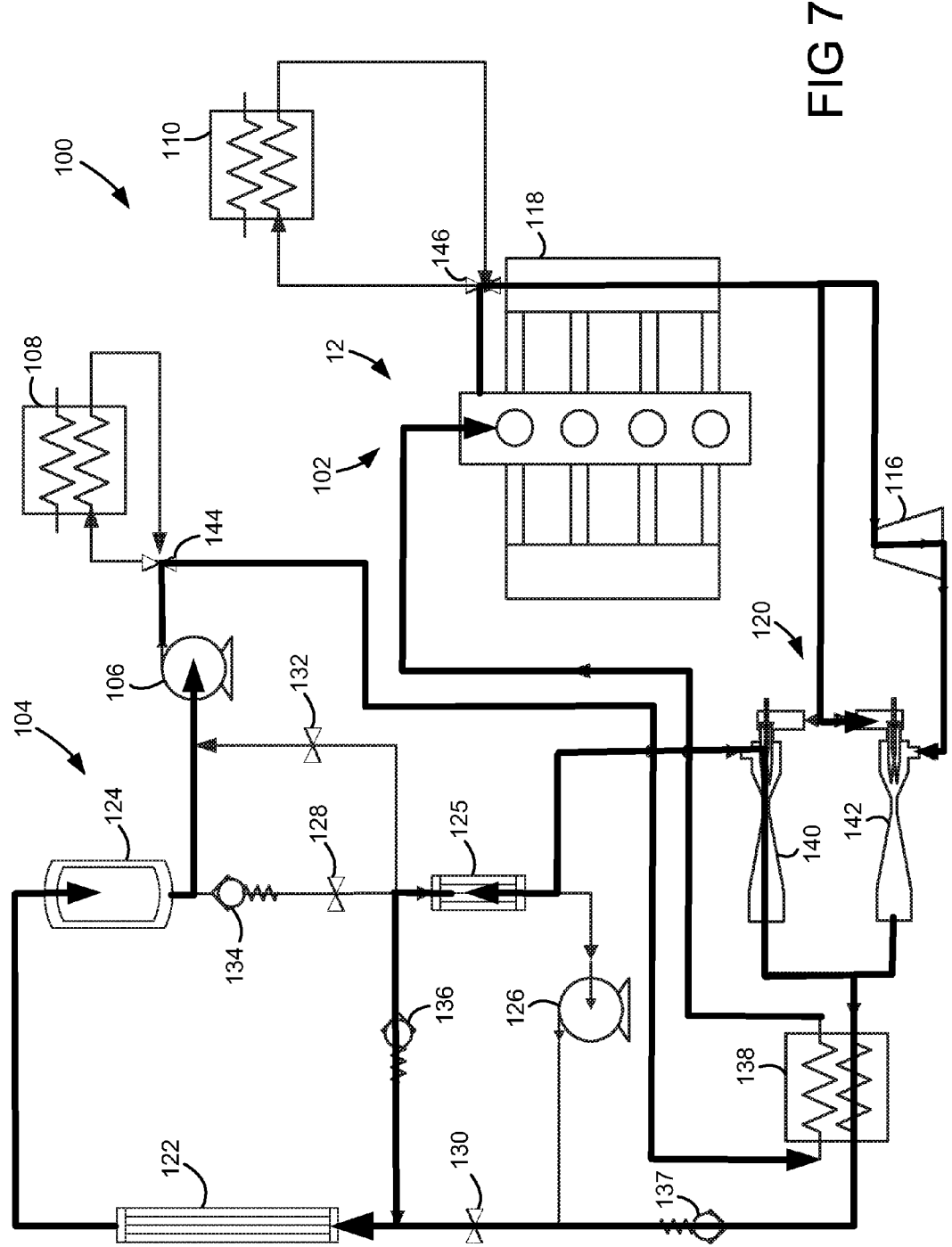
FIG. 7 is a schematic illustration of the waste heat recovery system of FIG. 2 in a fourth operating mode.

A fourth operating mode (engine fully warmed-up with cabin heating) is illustrated in FIG. 7. The fluid flow path defined during the fourth operating mode may be similar to the third operating mode. However, the ejector pump motive fluid solenoid for the first ejector pump 140 is closed and the regulating valve 130 between the economizer 138 and condenser 122 is positioned to create a pressure difference sufficient to open the second check valve 136 between the cabin heat exchanger 125 and the condenser 122.

The pressure difference causes a portion of the warm fluid exiting the second ejector pump 142 to backflow through the first ejector pump 140 and through the cabin heat exchanger 125 to heat the vehicle cabin and then to the condenser 122. The first check valve 134 located between the cabin heat exchanger 125 and the drier bottle 124 prevents the fluid flow from bypassing the condenser 122 while the recirculation valve 132 is closed.

Figure 8:
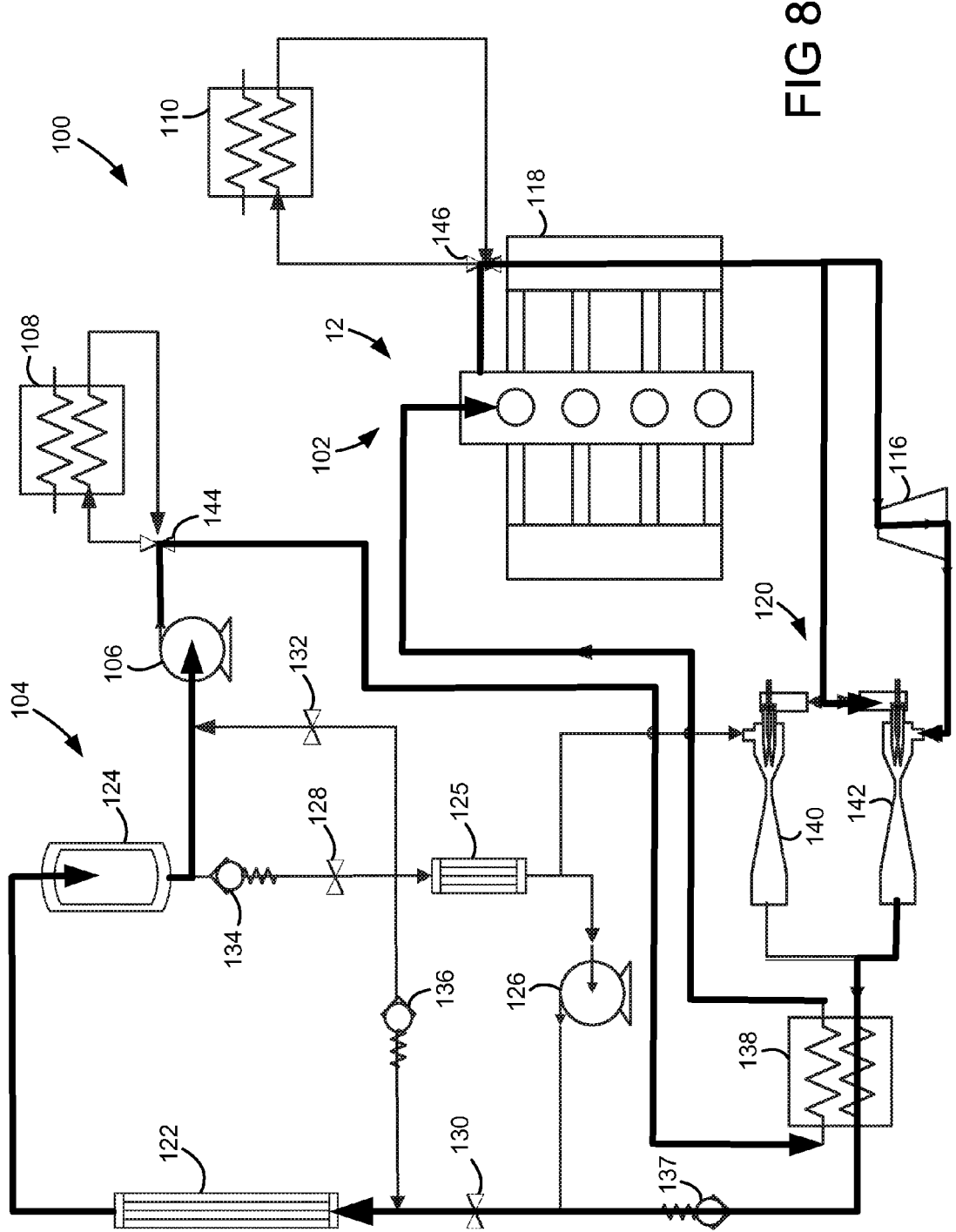
FIG. 8 is a schematic illustration of the waste heat recovery system of FIG. 2 in a fifth operating mode.

A fifth operating mode (engine fully warmed-up without cabin cooling) is illustrated in FIG. 8. The fluid flow path defined during the fifth operating mode may be similar to the third operating mode. However, the regulating valve 130 between the economizer 138 and condenser 122 may be fully open during the fifth operating mode to maintain the second check valve 136 between the cabin heat exchanger 125 and the condenser 122 in the closed position. Therefore, no fluid flow passes through the cabin heat exchanger 125 in the fifth operating mode.

As seen in FIG. 9, a vehicle exhaust system 148 may be incorporated into the waste heat recovery system 100. The exhaust system 148 may define an exhaust heat exchanger 150 including an inlet 152 and an outlet 154. A sixth control valve 156 may be located upstream of the inlet 152 to control fluid flow through the exhaust heat exchanger 150. The exhaust heat exchanger 150 may be part of a catalyst including, but not limited to, an oxidation catalyst or a selective catalytic reduction device.

In a first arrangement, the inlet 152 of the exhaust heat exchanger 150 may be in fluid communication with the first pump 106 and the outlet 154 of the exhaust heat exchanger 150 may be in communication with the waste heat recovery device 116. In the first arrangement, the exhaust heat exchanger 150 may act as an additional evaporator and heat the fluid ($F_{IN}$) provided by the first pump 106 via exhaust gas (E). The fluid ($F_{OUT}$) exiting the exhaust heat exchanger 150 may then be provided to the waste heat recovery device 116. The control valve 156 may be adjusted to maintain a desired operating temperature of the exhaust system 148.

In a second arrangement, the inlet 152 of the exhaust heat exchanger 150 may be in fluid communication with the fluid after it has already been heated. By way of non-limiting example, the inlet 152 may be in communication with an outlet of the waste heat recovery device 116. In the first arrangement, the exhaust heat exchanger 150 may be used to heat the exhaust system to a desired operating temperature. The control valve 156 may be adjusted to maintain a desired operating temperature of the exhaust system 148. The control valve 156 may additionally be controlled to adjust operation between the first and second arrangements discussed above. It is further understood that the exhaust heat exchanger 150 may be incorporated into the operating modes discussed above.

While illustrated in combination with a hybrid vehicle, it is understood that the present disclosure additionally applies to convention arrangements not including a hybrid propulsion system.

What is claimed is:

1. A vehicle waste heat recovery system comprising:
a first pump in fluid communication with a fluid;
an internal combustion engine operable to power rotation of a drive axle of a vehicle and defining an engine coolant passage having an inlet in fluid communication with an outlet of the first pump;
a waste heat recovery device having an inlet in fluid communication with an outlet of the engine coolant passage;
a condenser having an inlet in fluid communication with an outlet of the waste heat recovery device and an outlet in fluid communication with an inlet of the first pump; and
a cabin heat exchanger in fluid communication with the condenser and a second pump, the second pump being located between the cabin heat exchanger and the outlet of the waste heat recovery device, the waste heat recovery device operable in a cabin heating mode and a cabin cooling mode, the cabin heating mode including the second pump providing the fluid from the outlet of the waste heat recovery device through the cabin heat exchanger and then to the condenser and the cabin cooling mode including the second pump providing the fluid from the outlet of the waste heat recovery device through the condenser and then to the cabin heat exchanger.

2. The waste heat recovery system of claim 1, wherein the second pump includes a first ejector pump having a first motive fluid inlet and a second ejector pump having a second motive fluid inlet, wherein during the cabin heating mode the first motive fluid inlet being closed, the second motive fluid inlet being opened and the second ejector pump forcing the fluid from the outlet of the waste heat recovery device through the first ejector pump to the cabin heat exchanger, and wherein during the cabin cooling mode the first motive fluid inlet being open and the first ejector pump drawing the fluid from the outlet of the condenser through the cabin heat exchanger and returning the fluid to the inlet of the condenser.

3. The waste heat recovery system of claim 1, further comprising an electric motor operably engaged with the drive axle to propel the vehicle and cooperating with the internal combustion engine to form a hybrid powertrain, the waste heat recovery device including a drive mechanism operably engaged with the drive axle to propel the vehicle.

4. The waste heat recovery system of claim 3, wherein the drive mechanism is drivingly engaged with an engine crankshaft and is engaged with the drive axle via the crankshaft.

5. The waste heat recovery system of claim 3, wherein the drive mechanism is incorporated into a transmission of the vehicle and engaged with the drive axle via the transmission.

6. The waste heat recovery system of claim 3, further comprising a hybrid vehicle electronics heat exchanger and a transmission heat exchanger in fluid communication with the first pump and located between the outlet of the first pump and the inlet of the waste heat recovery device.

7. The waste heat recovery system of claim 1, further comprising a cabin heat exchanger, a second pump and an electric compressor, the cabin heat exchanger being in fluid communication with the condenser and the second pump, the second pump being located between the cabin heat exchanger and the outlet of the waste heat recovery device, and the electric compressor being located between the cabin heat exchanger and an inlet of the condenser.

8. A vehicle waste heat recovery system comprising:
a hybrid powertrain including:
an internal combustion engine operable to power rotation of a drive axle of a vehicle and defining an engine coolant passage; and
a hybrid power assembly including an electric motor operably engaged with the drive axle to propel the vehicle and a hybrid electronics heat exchanger;
a transmission heat exchanger;
a first pump in fluid communication with a fluid and having an outlet in fluid communication with an inlet of the engine coolant passage, an inlet of the hybrid electronics heat exchanger, and an inlet of the transmission heat exchanger; and
a waste heat recovery device including: an inlet in fluid communication with an outlet of the engine coolant passage, an outlet of the hybrid electronics heat exchanger, and an outlet of the transmission heat exchanger;
wherein the waste heat recovery device is incorporated into the hybrid powertrain and operably engaged with the drive axle to power rotation of the drive axle using energy recovered from the waste heat recovery system; and
a cabin heat exchanger in fluid communication with a condenser and a second pump, the second pump being located between the cabin heat exchanger and an outlet of the waste heat recovery device, the waste heat recovery device operable in a cabin heating mode and a cabin cooling mode, the cabin heating mode including the second pump providing the fluid from the outlet of the waste heat recovery device through the cabin heat exchanger and then to the condenser and the cabin cooling mode including the second pump providing the fluid from the outlet of the waste heat recovery device through the condenser and then to the cabin heat exchanger.

* * * * *